United States Patent
Zhou et al.

(10) Patent No.: US 9,672,557 B2
(45) Date of Patent: Jun. 6, 2017

(54) SYSTEM AND METHOD FOR IMPROVED PARALLEL SEARCH ON BIPARTITE GRAPHS USING DYNAMIC VERTEX-TO-PROCESSOR MAPPING

(71) Applicant: Palo Alto Research Center Incorporated, Palo Alto, CA (US)

(72) Inventors: Rong Zhou, San Jose, CA (US); Daniel Davies, Palo Alto, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 336 days.

(21) Appl. No.: 14/052,584

(22) Filed: Oct. 11, 2013

(65) Prior Publication Data

US 2015/0106223 A1    Apr. 16, 2015

(51) Int. Cl.
  *G06Q 30/06*    (2012.01)
  *G06Q 30/02*    (2012.01)
(52) U.S. Cl.
  CPC ..... *G06Q 30/0631* (2013.01); *G06Q 30/0282* (2013.01)
(58) Field of Classification Search
  CPC .......................................... G06Q 30/06–30/08
  USPC ................................................ 705/26.1–27.2
  See application file for complete search history.

(56) References Cited

U.S. PATENT DOCUMENTS

| | | | |
|---|---|---|---|
| 6,505,187 B1 * | 1/2003 | Shatdal | 707/737 |
| 2009/0064165 A1 * | 3/2009 | Arimilli et al. | 718/105 |
| 2013/0018755 A1 * | 1/2013 | Zhang | 705/26.7 |

* cited by examiner

*Primary Examiner* — Ethan D Civan
*Assistant Examiner* — Ming Shui
(74) *Attorney, Agent, or Firm* — Shun Yao; Park, Vaughan, Fleming & Dowler LLP

(57) ABSTRACT

One embodiment of the present invention provides a system for dynamically assigning vertices to processors to generate a recommendation for a customer. During operation, the system receives graph data with customer and product vertices and purchase edges. The system traverses the graph from a customer vertex to a set of product vertices. The system divides the set of product vertices among a set of processors. Subsequently, the system determines a set of product frontier vertices for each processor. The system traverses the graph from the set of product frontier vertices to a set of customer vertices. The system divides the set of customer vertices among a set of processors. Then, the system determines a set of customer frontier vertices for each processor. The system traverses the graph from the set of customer frontier vertices to a set of recommendable product vertices. The system generates one or more product recommendations for the customer.

19 Claims, 10 Drawing Sheets

A SEMI-BIPARTITE GRAPH EXAMPLE

SYSTEM AND METHOD FOR IMPROVED PARALLEL SEARCH ON BIPARTITE GRAPHS USING DYNAMIC VERTEX-TO-PROCESSOR MAPPING

The present disclosure is related to U.S. patent application Ser. No. 13/932,377, titled "System and Method for Parallel Search on Explicitly Represented Graphs," by inventor Rong Zhou, filed 1 Jul. 2013), the disclosure of which is hereby incorporated by reference herein.

The present disclosure is related to U.S. patent application Ser. No. 14/039,941, titled "System and Method for a High-Performance Graph Analytics Engine," by inventors Rong Zhou and Daniel Davies, filed 27 Sep. 2013), the disclosure of which is hereby incorporated by reference herein.

BACKGROUND

Field

The present disclosure relates to graph search. More specifically, this disclosure relates to a method and system for parallel processing of graphs.

Related Art

Graphs emerge in many analytics applications. An important class of graphs is bipartite graphs, where one can divide the set of vertices into two disjoint sets U and V such that every edge connects and only connects a vertex in U and a vertex in V. Because there is no edge between two vertices in U or two vertices in V, a bipartite graph does not contain any odd-length cycles.

Formally, a bipartite graph G is (U, V, E), where a vertex is either in U or V, and $U \cap V = \emptyset$. There is a set of edges $e \in E$, where e is of the form (u, v), if and only if there is a directed edge from vertex u to vertex v in G. In this case, u is the source vertex of e and also a predecessor of v, and v is the destination vertex of e and also a successor of u. If G is undirected, then $\forall (u, v) \in E \rightarrow (v, u) \in E$. If $|U|=|V|$, then G is called a balanced bipartite graph. FIG. 1A illustrates an example of a directed bipartite graph 10 in which only vertices 12, 14, 16, 18, and 20 in U can be the source vertex of an edge, and only vertices 22, 24, 26, and 28 in V can be the destination vertex of an edge.

Bipartite graphs are natural models of many real-world phenomena. FIG. 1A illustrates an example of a directed bipartite graph. In one example, the set of vertices in U of FIG. 1A can model a set of customers, and the set of vertices in V can model a set of products. An edge between $u \in U$ and $v \in V$ can represent that customer u bought product v. One can further analyze such bipartite graphs to determine valuable insights such as finding the right product(s) to recommend based on the purchase history of the customer(s).

A significant challenge to efficient analytics on bipartite graphs is search, which becomes harder as the number of vertices and edges increases. Fortunately, bipartite graphs usually contain a great deal of structure that can be leveraged to speed up the computation. For example, only even-length cycles can exist in a bipartite graph. Furthermore, a vertex $u \in U$ can only lead to another vertex $v \in V$ and vice versa. However, sometimes the structure of a bipartite graph can also lead to computational inefficiencies, if it is not exploited properly by the search algorithm. As an example, consider a parallel search application that divides up the vertices of a bipartite graph into a number of regions such that each region contains roughly $(|V|+|U|)/P$ vertices (where P is the number of parallel processors), and assigns vertices in the same region to the same processor. Although the goal is to keep all the processors busy during search, such a static vertex-to-processor assignment strategy may not work well for bipartite graphs. For example, if the search starts with a vertex or vertices in either U or V (but not both), then at any single traversal step, it can only traverse along edges of the form (u, v) or (v, u), where $u \in U$ and $v \in V$, but not both. Note that a traversal step is an operation in which an application or system determines the successor vertex v of a predecessor vertex u by analyzing the edge leading from u to v. This implies that one of the two conditions must hold in a single traversal step:

1. All edges with a source vertex $u \in U$ are not eligible for traversal, or
2. All edges with a source vertex $v \in V$ are not eligible for traversal In other words, no matter how the set of vertices in $U \in V$ is divided and subsequently assigned to processors, there is bound to be a subset of vertices that is guaranteed to not generate any useful computation in a single traversal step, therefore reducing the parallel efficiency of search on a bipartite graph. Vertices that do not have any successors in a given traversal step are called idle vertices. Note that whether a vertex is idle or not usually depends on the direction of traversal, even though a vertex without any neighbors (e.g., no predecessors or successors) must be idle regardless of the traversal direction.

To see how idle vertices can affect parallel search, consider the case where U represents 1,000,000 customers, and V represents 1,000 products. For simplicity, let's assume the customer vertices are numbered #0 to #999,999, and the product vertices #1,000,000 to #1,000,999. Suppose there are 1,000 processors available, and the task is to find out those customers who have bought at least one product in the past. If the bipartite structure of the graph is ignored, then a parallel search application will divide up the entire set of 1,000,000 customer vertices plus 1,000 product vertices into 1,000 regions, each of which would contain (1,000,000+1,000)/1000=1,001 vertices. This means the application assigns the first processor to process vertices numbered between #0 and #1,000, the second to process vertices between #1,001 and #2,001, and the last (1000th processor) to process vertices between #999,999 and #1,000,999. But only the last processor would do useful computation in this case, because the application assigns all the other 999 processors to idle vertices that represent customers, yet only product vertices can generate successors in the traversal direction from V (products) to U (customers). Ironically, the application even assigns to the last processor an idle vertex (#999,999) that represents the last customer, which doesn't need to be included in any product-to-customer traversal. Since only 1 out of 1,000 processors is doing useful work, no speed-up is achieved and the parallel efficiency is only 1/1,000=0.1%.

The above example shows that the structure of a bipartite graph can be a problem, if it is not leveraged properly by the parallel search application. In one approach, if the parallel search application mixes the product vertices with customer vertices in a single unified range between #0 and #1,000,999, then the parallel efficiency could be higher. However, the parallel efficiency is still not 100%, unless it so happens that there is exactly one product vertex mixed with every 1,000 customers. That is, the first 1,000 vertices (#0~#999) are customers, which is followed by a product vertex (#1000), then another 1,000 customers (#1001~#2000) followed by another product vertex (#2001), and so on. However, mixing the IDs of one type of vertices with the IDs of another type of vertices may compromise the original structure of the graph and cause additional time and space overhead in managing the mapping from vertex IDs to types. In light of these drawbacks, a better approach is desired.

SUMMARY

One embodiment of the present invention provides a system for dynamically assigning vertices to processors to generate a recommendation for a customer. During operation, the system receives graph data indicating vertices and edges of the graph, wherein the vertices represent customers and products and the edges represent purchases. Next, the system determines, based on the graph data, a vertex that represents a customer. The system then traverses the graph from the vertex representing the customer to a set of vertices representing products. The system divides the set of vertices representing products among a set of processors. Subsequently, the system determines a set of frontier vertices representing products for each processor of the set of processors. The system traverses, using the set of processors, the graph from the set of frontier vertices representing products to a set of vertices representing customers. The system divides the set of vertices representing customers among a set of processors. Then, the system determines a set of frontier vertices representing customers for each processor of the set of processors. The system traverses, using the set of processors, the graph from the set of frontier vertices representing customers to a set of vertices representing recommendable products. The system then generates one or more product recommendations for the customer based on the set of vertices representing recommendable products.

In a variation on this embodiment, dividing the set of vertices representing customers among a set of processors includes generating a bitmask $M_U$ such that $M_U[p]$, the value of the $p^{th}$ bit, is: 1, if a set of U→V frontier vertices for processor p is not null; 0, if a set of U→V frontier vertices for processor p is null, where U represents the set of customers and V the set of products; and assigning frontier vertices representing customers to a processor p if $M_U[p]$ is 1.

In a variation on this embodiment, dividing the set of vertices representing customers among a set of processors includes estimating a maximum number of vertices assigned to each processor according to a formula $\lfloor (u_{max}-u_{min}+1)/P \rfloor$, in which P is the number of processors, $u_{max}$ is a maximum integer identifier for vertices $\in U$, and $u_{min}$ is a minimum integer identifier for vertices$\in U$; and dividing the set of vertices representing customers uniformly among the set of processors based on the estimated maximum number of vertices assigned to each processor.

In a variation on this embodiment, dividing the set of vertices representing customers among a set of processors includes dividing the set of vertices representing customers non-uniformly among the set of processors.

In a variation on this embodiment, dividing the set of vertices representing products among a set of processors includes generating a bitmask $M_V$ such that $M_V[p]$, the value of the $p^{th}$ bit, is: 1, if a set of V→U frontier vertices for processor p is not null; 0, if a set of V→U frontier vertices for processor p is null, where V represents the set of products and U the set of customers; and assigning frontier vertices representing products to a processor p if $M_V[p]$ is 1.

In a variation on this embodiment, dividing the set of vertices representing products among a set of processors includes estimating a maximum number of vertices assigned to each processor according to a formula $\lfloor (v_{max}-v_{min}+1)/P \rfloor$, in which P is the number of processors, $v_{max}$ is a maximum integer identifier for vertices $\in V$, and $v_{min}$ is a minimum integer identifier for vertices$\in V$; and dividing the set of vertices representing products uniformly among the set of processors based on the estimated maximum number of vertices assigned to each processor.

In a variation on this embodiment, dividing the set of vertices representing products among a set of processors includes dividing the set of vertices representing products non-uniformly among the set of processors.

In a variation on this embodiment, the graph is a general graph, and the system divides a set of source vertices among a set of processors by generating a bitmask $M_S$ such that $M_S[p]$, the value of the $p^{th}$ bit, is: 1, if the set of frontier source vertices for processor p is not null; 0, if the set of frontier source vertices for processor p is null; and assigning frontier source vertices to a processor p if $M_S[p]$ is 1.

BRIEF DESCRIPTION OF THE FIGURES

In the figures, like reference numerals refer to the same figure elements.

DETAILED DESCRIPTION

Figure 1A:
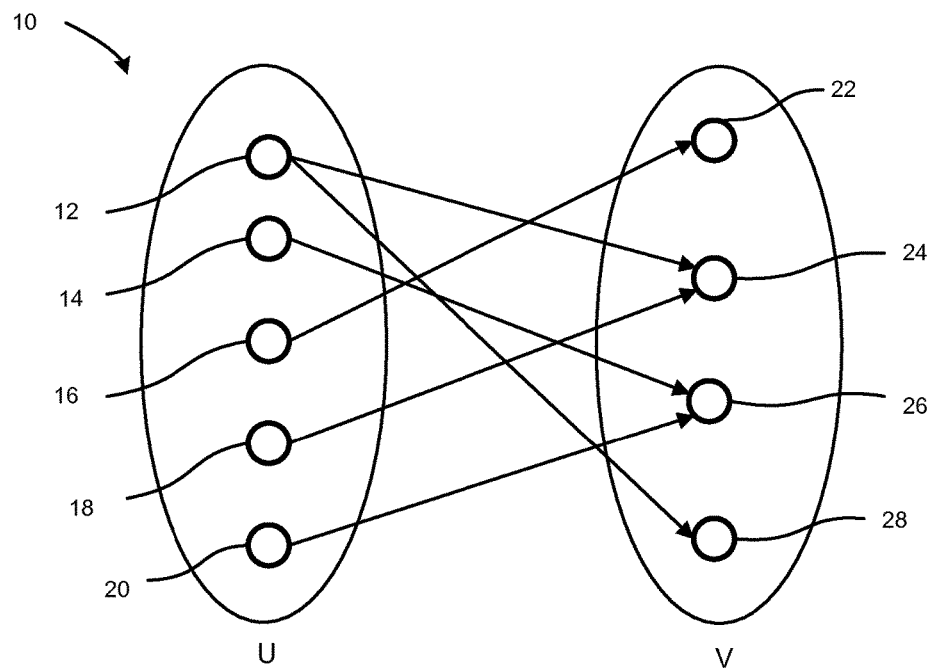
FIG. 1A illustrates an example of a directed bipartite graph.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of inefficient utilization of processors for graph traversal by dynamically assigning vertices to processors for traversal. Graph computation systems that statically assign vertices to processors do not fully utilize processor resources because some processors, being dedicated to certain vertices, remain idle during graph traversal. Rather than statically assigning processors to vertices, a graph computation system can use the techniques disclosed herein to dynamically assign vertices to processors, which can maximize the use of processor resources.

This disclosure discusses techniques for fully utilizing processor resources when searching and traversing bipartite, semi-bipartite, and general graphs. A semi-bipartite graph is a bipartite graph with edges in one partition. The system dynamically assigns frontier vertices to each respective processor for each graph traversal step. A frontier vertex is a vertex that a processor needs to process for a traversal step (e.g., a vertex representing a customer that needs a product recommendation). For example, for a bipartite graph with a set of vertices in U and a set of vertices in V, when the system traverses from vertices in U (e.g., customer vertices) to vertices in V (e.g., product vertices), represented as U→V, the system can dynamically assign frontier vertices in U to all processors. This fully utilizes the processing capabilities of the system. Likewise, when the system traverses from vertices in V to vertices in U, represented as V→U, the system dynamically assigns frontier vertices in V to all processors. Note that the system can divide the vertices uniformly or non-uniformly among processors.

In contrast, the standard static approach for assigning vertices to processors would assign, for example, 7 of 10 processors to handle U→V traversals, and assign 3 of 10 processors to handle V→U traversals. Under the standard static approach, the system does not utilize 3 of 10 processors when traversing from U→V. Furthermore, the system does not utilize 7 of 10 processors when traversing from V→U. This static approach does not maximize the use of processor resources, and can be avoided by dynamically assigning vertices to processors.

The sections below describe an architecture of a graph computation system, analyzes best-case parallel efficiency, introduces the concept of a bitmask, and then discusses a dynamic vertex-to-processor mapping strategy. The discussion also includes some example processes for dynamically assigning vertices to processors for U→V traversal, dynamically assigning vertices to processors for V→U traversal, and dynamically assigning vertices to processors for traversal from source vertices to destination vertices in general graphs. Finally, the sections below also disclose an exemplary process for generating a recommendation for a product, and an apparatus and system for dynamically assigning vertices to processors for traversal.

System Architecture

Figure 1B:
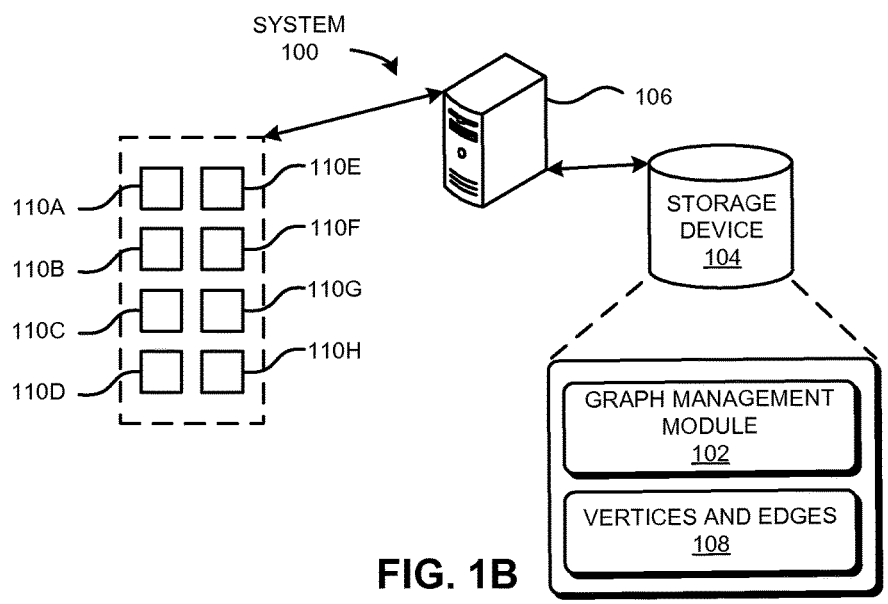
FIG. 1B presents a block diagram illustrating an exemplary architecture of a graph computation system utilizing the graph traversal technique, according to an embodiment

FIG. 1B presents a block diagram illustrating an exemplary architecture of a graph computation system 100 utilizing the graph traversal technique, according to an embodiment. Graph computation system 100 may divide up the vertices of a graph and process the vertices using multiple processors. Graph computation system 100 may search and traverse through the graph to facilitate various applications such as collaborative filtering. In standard systems, system 100 traverses the vertices of the graph by assigning the vertices to processors according to pre-determined static assignments. However, using the techniques disclosed herein, system 100 dynamically divides and assigns vertices to processors, thereby improving utilization of processor resources.

Graph computation system 100 may include a graph management module 102 installed on a storage device 104 coupled to a server 106. Note that various implementations of the present invention may include any number of servers and storage devices. In various implementations, graph management module 102 may include a graph analytics engine or other components of graph computation system 100 to perform the techniques described herein. System 100 may receive data describing vertices and edges and store such data in storage device 104. System 100 may read the code for graph management module 102 and the data for vertices and edges 108 from storage device 104. System 100 may dynamically divide the vertices and assign the vertices to processors, such as processors 110A-110H, which operate on the assigned vertices.

Best-Case Parallel Efficiency Analysis

Figure 2:
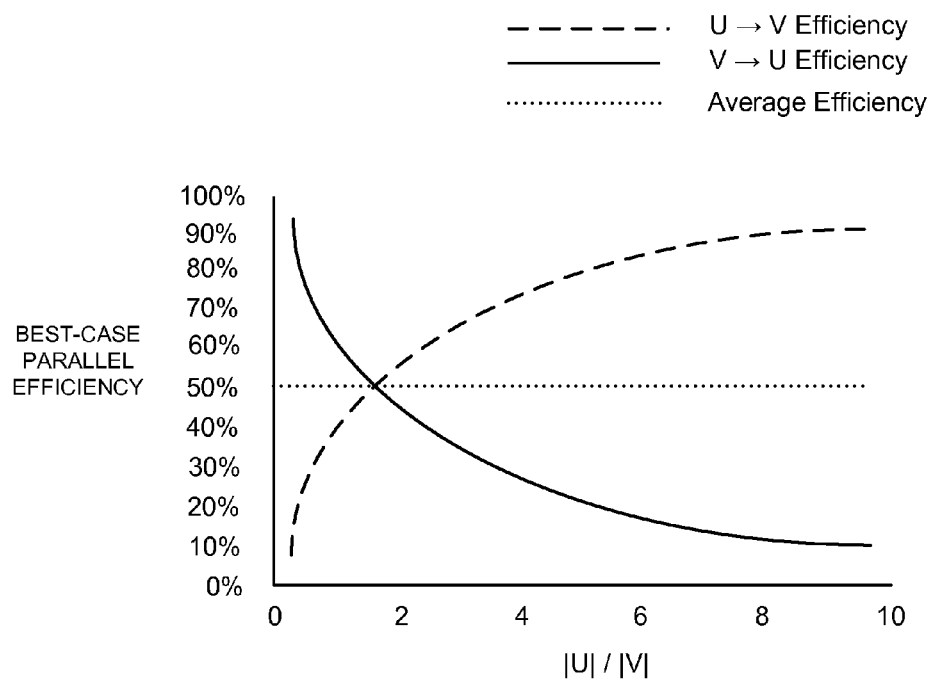
FIG. 2 presents a graph illustrating a best-case parallel efficiency as a function of the ratio between sizes of U and V.

FIG. 2 presents a graph illustrating a best-case parallel efficiency as a function of the ratio between sizes of U and V. FIG. 2 shows the theoretical best-case parallel efficiency (measured as speed increase divided by the number of processors) as a function of the ratio between the size of U and the size of V, for the following three cases:

1. U→V efficiency: the parallel efficiency for a single traversal step from vertices in U to vertices in V
2. V→U efficiency: the parallel efficiency for a single traversal step from vertices in V to vertices in U
3. Average efficiency: average between 1 & 2 above, each given the same weight As can be observed, a higher ratio of |U| over |V| increases the best-case parallel efficiency for traversal steps in the direction of U→V, but at the same time, decreases the efficiency for traversals in the V→U direction. If the two directions of traversal are equally important, then the overall parallel efficiency is only 50% in the best case scenario, regardless of the ratio between |U| and |V|. Note that the efficiency can only be lower in practice, due to the overhead in various stages of parallelization.

In applications where one direction of traversal is more important than the other, the 50% average efficiency is only a loose upper bound. In the previous customer-bought-product example, a classic application is to make recommendations based on the following collaborative filter:

Step 1: Starting from a customer vertex, find the set of products purchased by the customer Step 2: Find other customers who have purchased at least one of these products Step 3: Find the most popular product purchased by these customers Note that the amount of computation needed for each step can differ significantly. Step 1 only requires graph traversal from a single vertex, which is relatively inexpensive. Step 2 typically requires traversal from multiple product vertices, as long as the customer bought more than 1 product in the past. Furthermore, while a single customer may purchase a small number of products, a single (especially popular) product can be purchased by thousands if not millions of customers. In other words, not only does Step 2 require processing of multiple vertices, but also it needs to perform considerably more computations at each vertex. Therefore, it is common for Step 2 to traverse orders of magnitude more edges than Step 1, and this makes the traversal direction from V (products) to U (customers) more computationally intensive than the opposite direction. Typically, there are more customers than there are product types, so it is safer to assume |U|≥|V| than the other way around.

According to FIG. 2, if |U|=|V|, e.g., a balanced bipartite graph, then the best-case parallel efficiency for Step 2 is 50% in theory. But if |U|=10|V|, e.g., there are 10 times more customers than product types, then Step 2 can only achieve at most 9.1% parallel efficiency in theory. Moreover, if there are 100 or 1,000 times more customers than products, then the parallel efficiency would drop further to 1% and 0.1%, respectively. Since it is not uncommon for businesses to have customers in the millions (or more) and product types in the thousands (or less), 0.1% or lower parallel efficiency can occur in practice.

The analysis so far is based on the assumption that the parallel search application does not discriminate between U and V when assigning vertices to processors. If the application receives data upfront indicating that the graph is bipartite and the traversal being performed is U→V (or V→U), then the application only needs to assign U vertices (or V vertices) to the processors and the problem is solved. However, this is not a general solution, because (a) testing if a graph is bipartite can be computationally expensive and (b) a non-bipartite graph may still have a similar structure that manifests the same issue.

Figure 3:
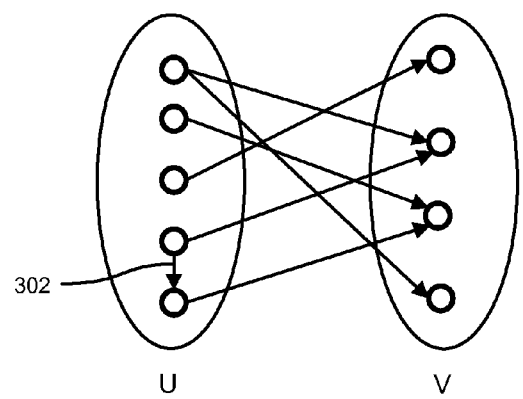
FIG. 3 presents a block diagram illustrating an exemplary semi-bipartite graph.

FIG. 3 presents a block diagram illustrating an exemplary semi-bipartite graph. If one ignores the edge represented by arrow 302 in FIG. 3, then the graph becomes bipartite. It can be shown that the same parallelization issue occurs in semi-bipartite graphs as well.

Even if the graph is bipartite and the application receives this information, assigning all vertices of U or V to the processors can still be sub-optimal, if the application only needs to process a subset of these vertices. In Step 1 of the collaborative filter example, the application only needs to process a single vertex in U, which represents the customer receiving the recommendations, and the rest of the 999,999 customers do not require processing. A similar issue can occur in Step 2 if the customer only bought a subset of all the products. Efficiently finding vertices on the search frontier (e.g., those that need to be processed) without enumerating all the vertices in either U or V can be a challenge.

Exemplary Bitmask Summarizing a Search Frontier

Figure 4:
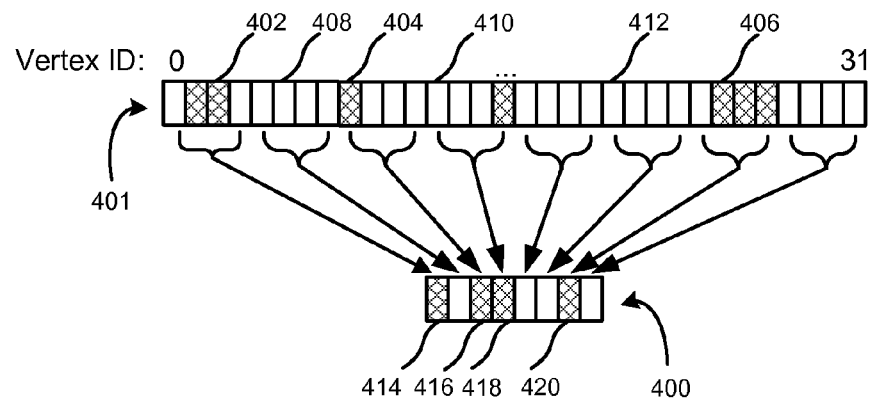
FIG. 4 presents a block diagram illustrating an exemplary bitmask summarizing a search frontier.

FIG. 4 presents a block diagram illustrating an exemplary bitmask 400 summarizing a search frontier 401. FIG. 4 depicts an example of using a bitmask of 8 bits to represent a summary of the current search frontier for a graph with 32 vertices with ID numbered from 0 to 31. For search frontier 401, blocks with crosshatching represent vertices on the search frontier, and empty blocks represent non-frontier vertices. For example, blocks 402, 404, and 406 represent vertices on the search frontier, and blocks 408, 410, and 412 represent non-frontier vertices.

In the depicted example, system 100 sets the $k^{th}$ bit of the bitmask (e.g., the block is not empty) if and only if any of the vertices with an ID∈[4 k, 4 k+3] is on the search frontier. If these bits correspond to 8 processors numbered from 0 to 7, each responsible for processing 4 vertices with consecutive IDs, then there are no vertices for the $k^{th}$ processor to process unless the $k^{th}$ bit of bitmask 400 is set. For example, as indicated by bits 414, 416, 418, and 420 processors 0, 2, 3, 6 each process a subrange of vertices that includes frontier vertices. However, there are no frontier vertices for processors 1, 4, 5, and 7 to process. This is a standard technique to quickly skip some idle vertices without affecting the final results of the search. However, when applied to bipartite graphs, if system 100 applies a static mapping from vertices to processors this technique has all the shortcomings mentioned previously.

Accommodating the special logic that exploits bipartite graphs in a general purpose graph analytics engine designed to process not only bipartite but also non-bipartite graphs can be a challenge. For parallel efficiency, one approach is to use a bitmap mask to sketch out the presence (or absence) of frontier vertices, e.g., those that need to be processed at the current traversal step, such that certain regions of the vertex space can be safely ignored.

Figure 5:
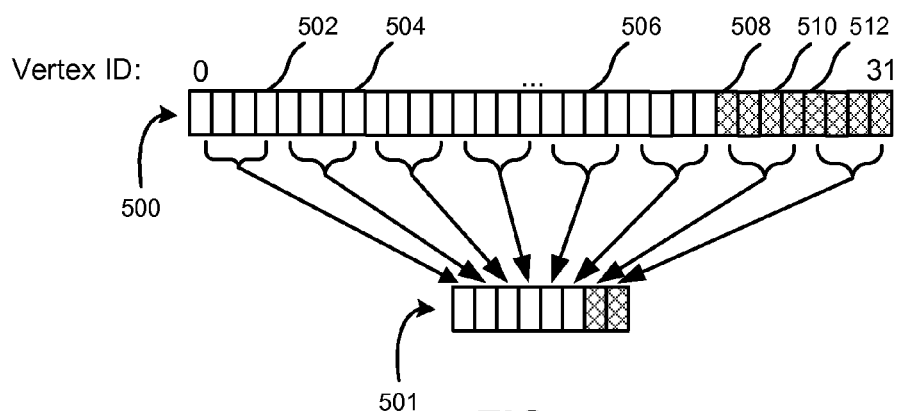
FIG. 5 presents a block diagram illustrating an exemplary bipartite graph search frontier and the corresponding static bitmask.

FIG. 5 presents a block diagram illustrating an exemplary bipartite graph search frontier 500 and the corresponding static bitmask 501. For FIG. 5, the corresponding graph is bipartite, with vertices #0~#23∈U (e.g., blank blocks) and vertices #24~#31∈V (e.g., blocks with crosshatching). Examples of blank blocks representing vertices #0~#23 include blocks 502, 504, and 506. Examples of blocks with crosshatching representing vertices #24-#31 include blocks 508, 510, and 512.

In a V→U traversal step where all 8 vertices ∈V are on the frontier, system 100 can only use the last 2 out of 8 processors, since the other first 6 processors are statically dedicated to processing the 24 vertices ∈U, which are guaranteed to be idle vertices in any V→U traversal step. Thus, the best-case parallel efficiency is only 2/8=25%. In this example, since |U|/|V|=24/8=3, according to FIG. 2, the same 25% parallel efficiency can be found on the V→U efficiency curve depicted in FIG. 2. This is not a surprising result, because a static vertex-to-processor mapping must inherit all the aforementioned issues related to parallel search on bipartite graphs.

Dynamic Vertex-to-Processor Mapping Strategy

To facilitate utilization of all processors in a single-direction traversal step, this disclosure describes below a dynamic vertex-to-processor mapping strategy that can adjust the affinity between vertices and processors on the fly based on the direction of graph traversal. Let P be the number of processors available for parallel search. For simple illustration, assume each vertex has an integer ID. Let $u_{min}$ and $u_{max}$ be the minimum and maximum integer ID for vertices ∈U, and let $v_{min}$ and $v_{max}$ be the minimum and maximum integer ID for vertices ∈V. For a bipartite graph that has two partitions U and V with disjoint vertex ID ranges, one of the following two inequalities must hold:

$u_{min} \leq u_{max} < v_{min} \leq v_{max}$, or $v_{min} \leq v_{max} < u_{min} \leq u_{max}$ In a bipartite graph, there are only two kinds of basic traversal steps, which are U→V traversal and V→U traversal. In the former case, all the source vertices are ∈U and all the destination vertices are ∈V, whereas V→U traversal is the opposite. These two cases are discussed separately below.

The U→V Traversal Case

Let $U_{min}$ be an integer array of (P+1) elements such that $U_{min}[0] = u_{min}$ $U_{min}[p] < U_{min}[p+1]$, for p=0, 1, . . . , P−1.

$U_{min}[P] = u_{max} + 1$

Using $U_{min}$, one can divide the entire set of vertices ∈U into P disjoint subsets such that:

$U_p = \{u | u \in U \nabla U_{min}[p] \leq ID(u) < U_{min}[p+1]\}$, for p=0, 1, . . . , P−1.

ID(u) is a function that returns the ID of a vertex u between $u_{min}$ and $u_{max}$. Note that $U_p$ is the largest subset of vertices $\epsilon U$ that system 100 can possibly assign to processor p in a U→V traversal step. Let $U^*_p$ be the set of U→V frontier vertices for processor p:

$U^*_p = \{u | u \epsilon U_p \nabla \text{frontier}(u) = \text{true}\}$ where frontier(u) is a Boolean function that returns true if and only if vertex u is on the U→V search frontier. Let $M_U$ be a bitmask of P bits such that $M_U[p]$, the value of the $p^{th}$ bit, is:

1, if $U^*_p \neq \emptyset$
0, if $U^*_p = \emptyset$

Apparently, processor p has no frontier vertices to process in a U→V traversal step if $M_U[p]=0$, and thus system 100 can safely skip that processor p. On the other hand, $M_U[p]=1$ means there is at least one frontier vertex $u \epsilon U$ for processor p to process, although in the worst case there can be as many as $|U_p|$ vertices, since $|U^*_p| \leq |U_p|$.

The V→U Traversal Case

Let $V_{min}$ be an integer array of (P+1) elements such that
$V_{min}[0] = v_{min}$
$V_{min}[p] < V_{min}[p+1]$, for p=0, 1, . . . , P−1.
$V_{min}[P] = v_{max}+1$ One can divide the entire set of vertices $\epsilon V$ into P disjoint subsets such that:

$V_p = \{v | v \epsilon V \nabla V_{min}[p] \leq \text{ID}(v) < V_{min}[p+1]\}$, for p=0, 1, . . . , P−1.

ID(v) is a function that returns the ID of a vertex v between $v_{min}$ and $v_{max}$. $V_p$ is the largest subset of vertices $\epsilon V$ that system 100 can possibly assign to processor p in a V→U traversal step. Let $V^*_p$ be the set of V→U frontier vertices for processor p:

$V^*_p = \{v | v \epsilon V_p \nabla \text{frontier}(v) = \text{true}\}$ where frontier(v) returns true if and only if vertex v is on the V→U search frontier.

Let $M_V$ be a bitmask of P bits such that $M_V[p]$, the value of the $p^{th}$ bit, is:

1, if $V^*_p \neq \emptyset$
0, if $V^*_p = \emptyset$ $M_V[p]=0$ indicates that processor p has no frontier vertices to compute. $M_V[p]=1$ implies that there is at least one frontier vertex $v \epsilon V$ for processor p to process, although in the worst case there can be as many as $|V_p|$ vertices, since $|V^*_p| \leq |V_p|$.

With the bitmasks $M_U$ and $M_V$, one can formally define a dynamic bitmask M as:

M=$M_U$ in U→V traversal
M=$M_V$ in V→U traversal

For efficient implementation, system 100 can store $M_U$ and $M_V$ in the same bitmap array with P bits, provided that (a) traversals in opposite directions are not performed at the same time and (b) multiple traversals in the same direction, if any, are compatible with one another (e.g., can use the same $M_U$ or $M_V$ in the parallel search).

Similarly, with the help of $U^*_p$ and $V^*_p$, one can define the set of workload vertices for processor p, $W^*_p$, as follows:

$W^*_p = U^*_p$ in U→V traversal
$W^*_p = V^*_p$ in V→U traversal

The above vertex-to-processor mapping strategy is dynamic, since the mapping changes with the direction of the graph traversal.

Integer Arrays $U_{min}$ and $V_{min}$

The purpose of the integer arrays $U_{min}$ and $V_{min}$ is to divide up the vertex ID ranges [$u_{min}$, $u_{max}$] and [$v_{min}$, $v_{max}$] into P disjoint subranges. For example, one way to divide up [$u_{min}$, $u_{max}$] is to have P approximately equal-sized subranges, where the first P−1 subranges have exactly the same size $\lfloor (u_{max}-u_{min}+1)/P \rfloor$, and the last partition contains the rest of the vertices $\epsilon U$. That is, $U_{min}[0] = u_{min}$
$U_{min}[p] = u_{min} + p \lfloor (u_{max}-u_{min}+1)/P \rfloor$, for p=1, . . . , P−1.
$U_{min}[P] = u_{max}+1$ The above vertex partitioning scheme is called uniform vertex distribution. Note that $\lfloor (u_{max}-u_{min}+1)/P \rfloor$ is only the worst-case vertex size of the first (P−1) subranges, and the actual number of vertices on the search frontier may vary from one traversal step to another. There are other ways of dividing up the range between $v_{min}$ and $v_{max}$, including partitions with non-uniform worst-case vertex sizes. For example, one possibility is to allow non-uniform sizes in order to make the actual frontier size approximately the same across all subranges to improve load balancing. Other variations are also possible, provided that the mapping from vertices to subranges is deterministic, e.g., a single frontier vertex maps to exactly one subrange.

Dynamic Vertex-to-Processor Mapping Examples

The two examples FIG. 6 and FIG. 7 below illustrate how the dynamic mapping strategy can improve parallel efficiency. One example is for the U→V traversal case and the other example is for the V→U traversal case.

Figure 6:
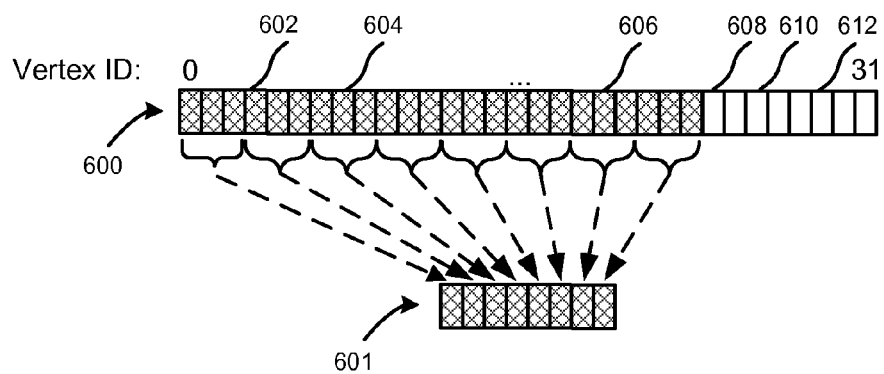
FIG. 6 illustrates an exemplary U→V search frontier and a corresponding dynamic bitmask, according to an embodiment.

FIG. 6 illustrates an exemplary U→V search frontier 600 and a corresponding dynamic bitmask 601, according to an embodiment. FIG. 6 depicts the same bipartite graph as in FIG. 5, but with a dynamic vertex-to-processor mapping that keeps all the processors busy instead of only the first 6. The blocks corresponding to frontier vertices $\epsilon U$ are depicted with crosshatching. Examples of blocks corresponding to frontier vertices $\epsilon U$ include blocks 602, 604, and 606. Since the vertices $\epsilon V$ must be idle in any U→V traversal step, the blocks corresponding to vertices $\epsilon V$ are all depicted as empty blocks (to indicate the blocks are ineligible for traversal). Examples of blocks corresponding to vertices $\epsilon V$ include blocks 608, 610, and 612.

Because there are 24 frontier vertices and P=8, then $u_{min}=0$, $u_{max}=23$, and $\lfloor (u_{max}-u_{min}+1)/P \rfloor=24/8=3$. Under the uniform vertex distribution scheme, $U_{min}=\{0, 3, 6, \ldots, 24\}$ and $U^*_p = U_p = \{u | 3p \leq \text{ID}(u) < 3p+3\}$ for p=0, 1, . . . , 7. In other words, system 100 assigns each processor p with three vertices with an ID in the range of [3p, 3p+3), which is the optimal vertex-to-processor assignment strategy with 100% processor utilization. For comparison, the static mapping strategy achieves 75% processor utilization.

Note that the vertex identifier (ID) ranges for different vertex types should be disjoint from one another, so that the vertices $\epsilon U$ are not mixed together with the vertices $\epsilon V$. For higher efficiency, same-type vertices should have consecutive IDs, although this is not strictly required.

Figure 7:
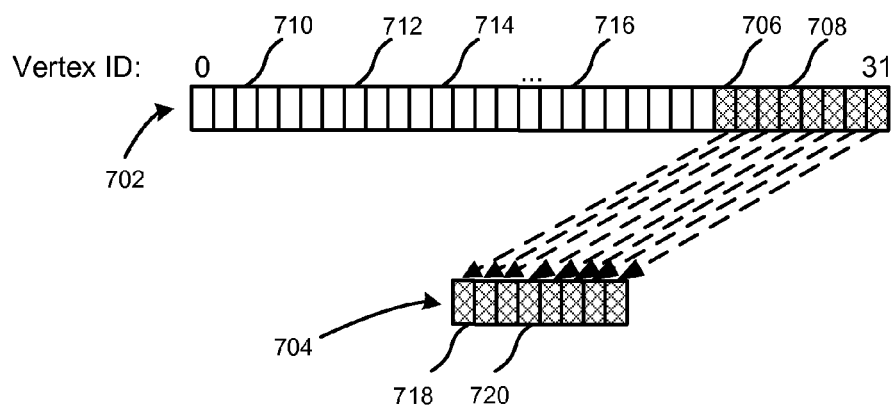
FIG. 7 illustrates an exemplary V→U search frontier and the corresponding dynamic bitmask, according to an embodiment.

FIG. 7 illustrates an exemplary V→U search frontier 702 and the corresponding dynamic bitmask 704, according to an embodiment. For V→U traversal, FIG. 7 depicts the same bipartite graph as in FIG. 5, but with a dynamic vertex-to-processor mapping that keeps all the 8 processors busy, instead of only the last 2 processors as depicted in FIG. 5. The blocks corresponding to frontier vertices $\epsilon V$ are shown with crosshatching, which include, for example, blocks 706 and 708. Since the vertices $\epsilon U$ must be idle in any V→U traversal step, FIG. 7 depicts the blocks corresponding to vertices $\epsilon U$ as empty blocks, including, for example, blocks 710, 712, 714, and 716. Because there are 8 frontier vertices and P=8 as well, the number of vertices per processor may be computed as follows: $v_{min}=24$, $v_{max}=31$, and $\lfloor (v_{max}-v_{min}+1)/P \rfloor=8/8=1$. Under the uniform vertex distribution scheme, $V_{min}=\{24, 25, 26, \ldots, 32\}$ and $V^*_p = V_p = \{v | \text{ID}(v)=24+p\}$ for p=0, 1, . . . , 7. In other words, system 100 assigns each processor p with a single vertex with an ID of 24+p, which is the optimal vertex-to-processor assignment strategy with 100% processor utilization. For example, system 100 assigns frontier vertices 706 and 708 to processors 718 and 720, respectively. For comparison, the static mapping strategy achieves only 25% processor utilization.

Dynamic Mapping on General Graphs

The dynamic mapping strategy disclosed herein is not limited to bipartite graphs. Below is a description of an efficient generalization that can speed up parallel search on general graphs, including semi-bipartite graphs. To distinguish from vertices in a bipartite graph, the symbols 'n' and 'N' denote a vertex and the set of vertices in a general graph. Let $N_{src}$ be the set of source vertices, e.g., those with at least one (1) successor, among all the vertices $\epsilon N$ in a general graph. Let $n_{min-src}$ and $n_{max-src}$ be the minimum and maximum integer identifiers of $N_{src}$, respectively. Let $N_{min-src}$ be an integer array of (P+1) elements such that $N_{min-src}[0]=n_{min-src}$
$N_{min-src}[p]<N_{min-src}[p+1]$, for p=0, 1, ..., P-1.
$N_{min-src}[P]=n_{max-src}+1$ Using $N_{min-src}$, system 100 can divide the entire set of source vertices $N_{src}$ into P disjoint subsets such that:

$S_p=\{n|n\epsilon N_{src} \nabla N_{min-src}[p] \leq ID(n) < N_{min-src}[p+1]\}$, for p=0, 1, ..., P-1

Let $S^*_p$ be the set of frontier vertices for processor p:
$S^*_p=\{n|n\epsilon S_p \nabla frontier(n)=true\}$ Let $M_S$ be a bitmask of P bits such that $M_S[p]$, the value of the $p^{th}$ bit, is:
1, if $S^*_p \neq \emptyset$
0, if $S^*_p = \emptyset$ $M_S[p]=0$ means processor p has no frontier vertices to compute. $M_S[p]=1$ implies that there is at least one frontier vertex for processor p to process, although in the worst case there can be as many as $|S_p|$ vertices.

To see why the above formulation is a generalization, one may examine the relationship between $M_S$ and the dynamic bitmask M defined for bipartite graphs. As noted previously, $M=M_U$ in U→V traversal and $M=M_V$ in V→U traversal. For U→V traversal, the set of source vertices is U, and $\forall p$, $U_p=S_p$ and $U^*_p=S^*_p$. Thus, $M_U=M_S$ in U→V traversal. For V→U traversal, the set of source vertices is V, and $\forall p$, $V_p=S_p$ and $V^*_p=S^*_p$. Thus, $M_V=M_S$ in V→U traversal. In both cases, $M=M_S$ and therefore the two are equivalent on bipartite graphs. Because the set of source vertices in any traversal step is always well defined, $M_S$ is applicable to general graphs, whereas M ($M_U$ or $M_V$) is not, because it is based on the notion of U and V vertices, which can only be found in bipartite graphs.

Exemplary Processes

Figure 8:
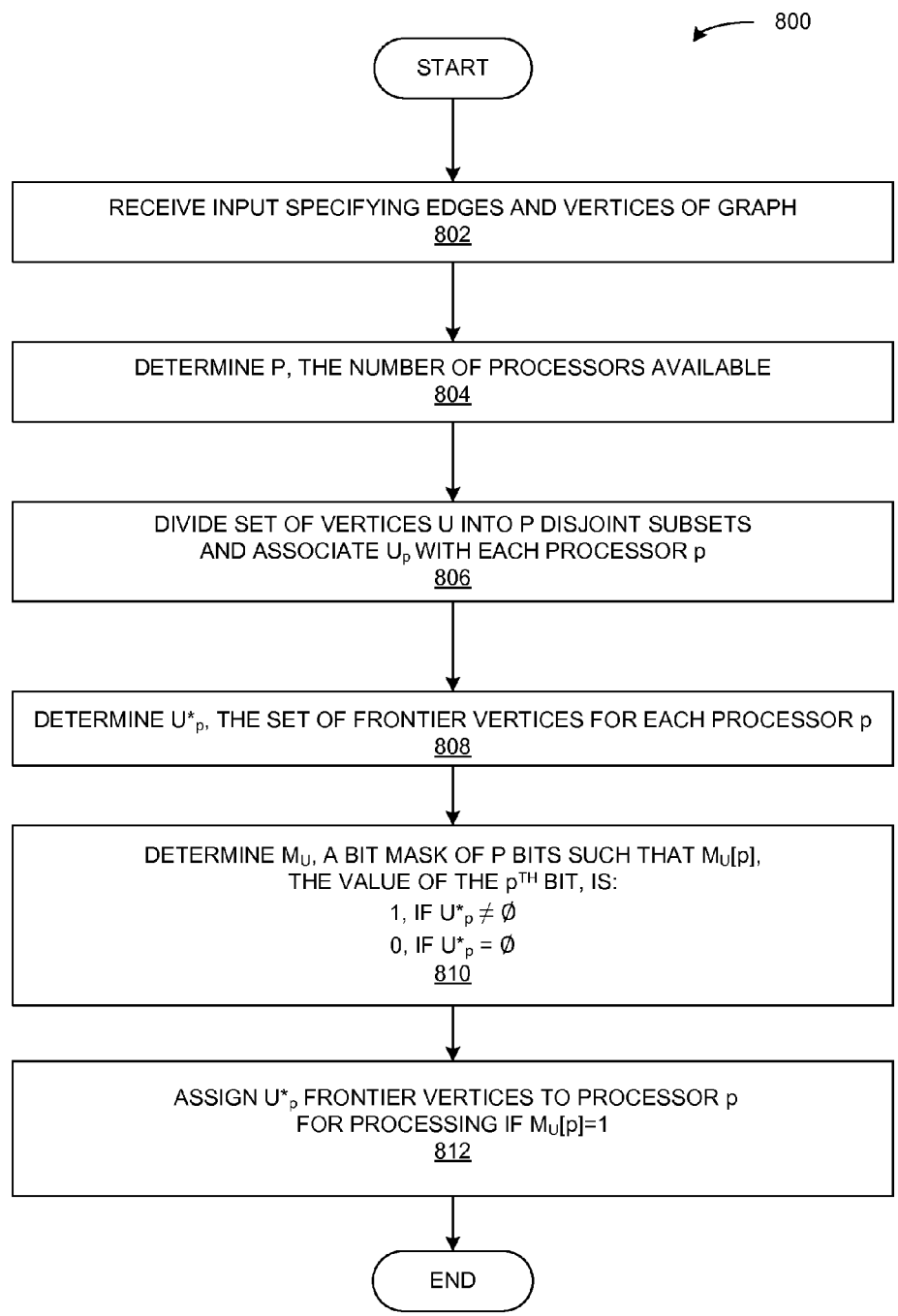
FIG. 8 presents a flowchart illustrating an exemplary process for dynamically assigning vertices to processors for U→V traversal, according to an embodiment.

FIG. 8 presents a flowchart illustrating an exemplary process for dynamically assigning vertices to processors for U→V traversal, according to an embodiment. During operation, system 100 receives input specifying edges and vertices of the graph (operation 802). System 100 may obtain the graph data through user input or as previously stored graph data or through any other method. Next, system 100 determines the number of processors (operation 804). For example, system 100 may determine that P=50 for 50 processors. Note that system 100 need not perform steps 802 and 804 each time system 100 assigns vertices to processors. In some implementations, system 100 may perform steps 802 and step 804 once for each graph, and subsequently receive additional data regarding graph changes.

When system 100 executes a U→V traversal step, system 100 dynamically determines the vertices in the set of vertices U to assign to each processor. Initially, system 100 divides the set of vertices U into p disjoint subsets $U_p$, each subset $U_p$ associated with each processor p (operation 806). Next, system 100 determines $U^*_p$, the set of frontier vertices for processor p (operation 808). System 100 then determines $M_U$, which is a bit mask of p bits such that $M_U[p]$, the value of the $p^{th}$ bit, is 1 if $U^*_p \neq \emptyset$, and such that the value of the $p^{th}$ bit is 0 if $U^*_p=\emptyset$ (operation 810). System 100 then assigns the $U^*_p$ frontier vertices to processor p for processing if $M_U[p]=1$ (operation 812). Note that if $M_U[p]=0$, this means that there are no frontier vertices for the processor p to work on, and, in some embodiments, system 100 may take some work from other processors to assign to processor p.

Figure 9:
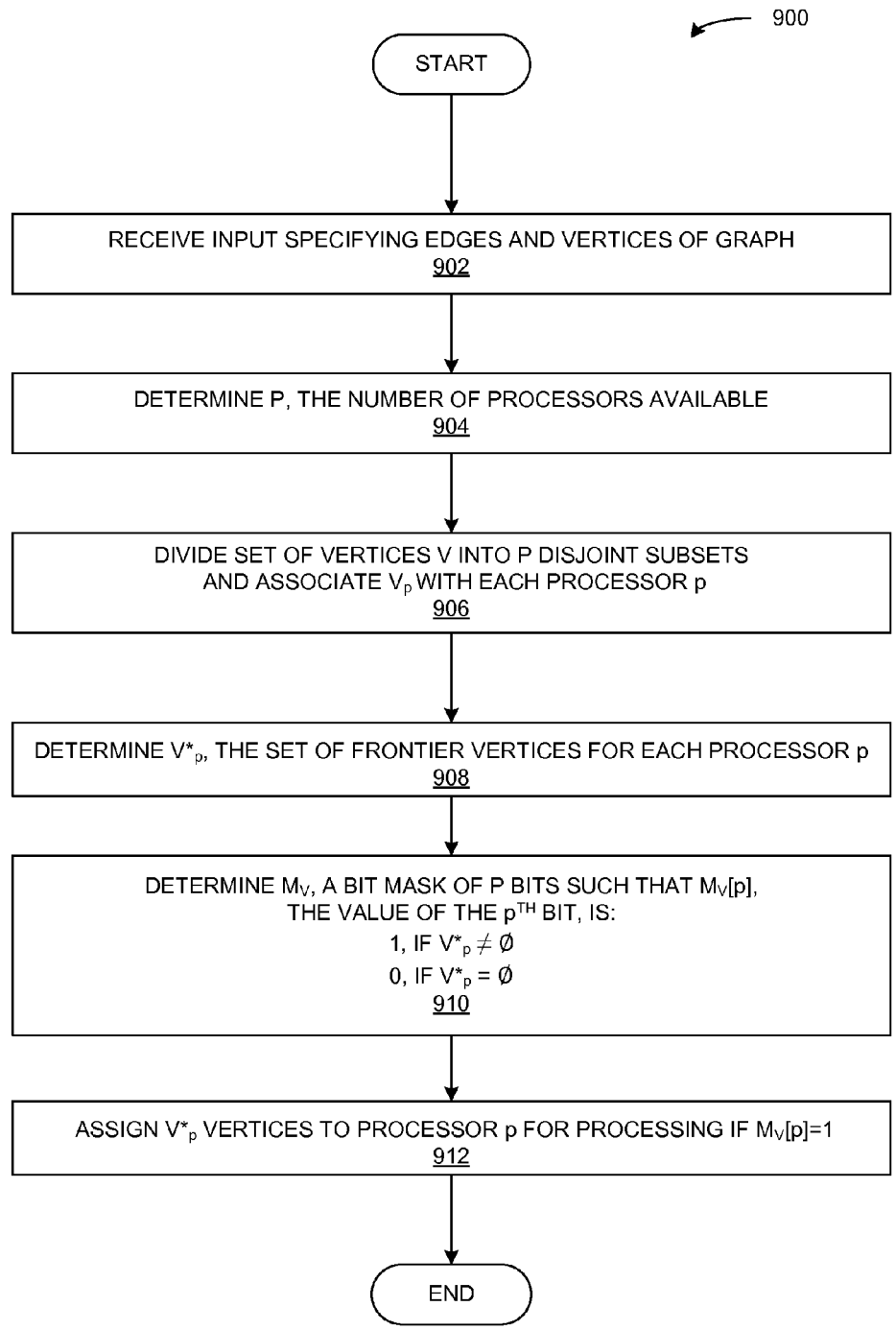
FIG. 9 presents a flowchart illustrating an exemplary process for dynamically assigning vertices to processors for V→U traversal, according to an embodiment.

FIG. 9 presents a flowchart illustrating an exemplary process for dynamically assigning vertices to processors for V→U traversal, according to an embodiment. During operation, system 100 receives input specifying edges and vertices of the graph (operation 902). System 100 may obtain the graph data through user input or as previously stored graph data or through any other method. Next, system 100 determines the number of processors (operation 904). For example, system 100 may determine that P=50 for 50 processors. Note that system 100 need not perform steps 902 and 904 each time system 100 assigns vertices to processors. In some implementations, system 100 may perform steps 902 and step 904 once for each graph, and subsequently receive data regarding graph changes.

When system 100 executes a V→U traversal step, system 100 dynamically determines the vertices in the set of vertices V to assign to each processor. Initially, system 100 divides the set of vertices V into p disjoint subsets $V_p$, each subset $V_p$ associated with each processor p (operation 906). Next, system 100 determines $V^*_p$, the set of frontier vertices for processor p (operation 908). System 100 then determines $M_V$, which is a bit mask of p bits such that $M_V[p]$, the value of the $p^{th}$ bit, is 1 if $u^*_p \neq \emptyset$, and such that the value of the $p^{th}$ bit is 0 if $V^*_p=\emptyset$ (operation 910). System 100 then assigns the $V^*_p$ frontier vertices to processor p for processing if $M_V[p]=1$ (operation 912). Note that if $M_V[p]=0$, this means that there are no frontier vertices for the processor p to work on, and, in some embodiments, system 100 may take some work from other processors to assign to processor p.

Figure 10:
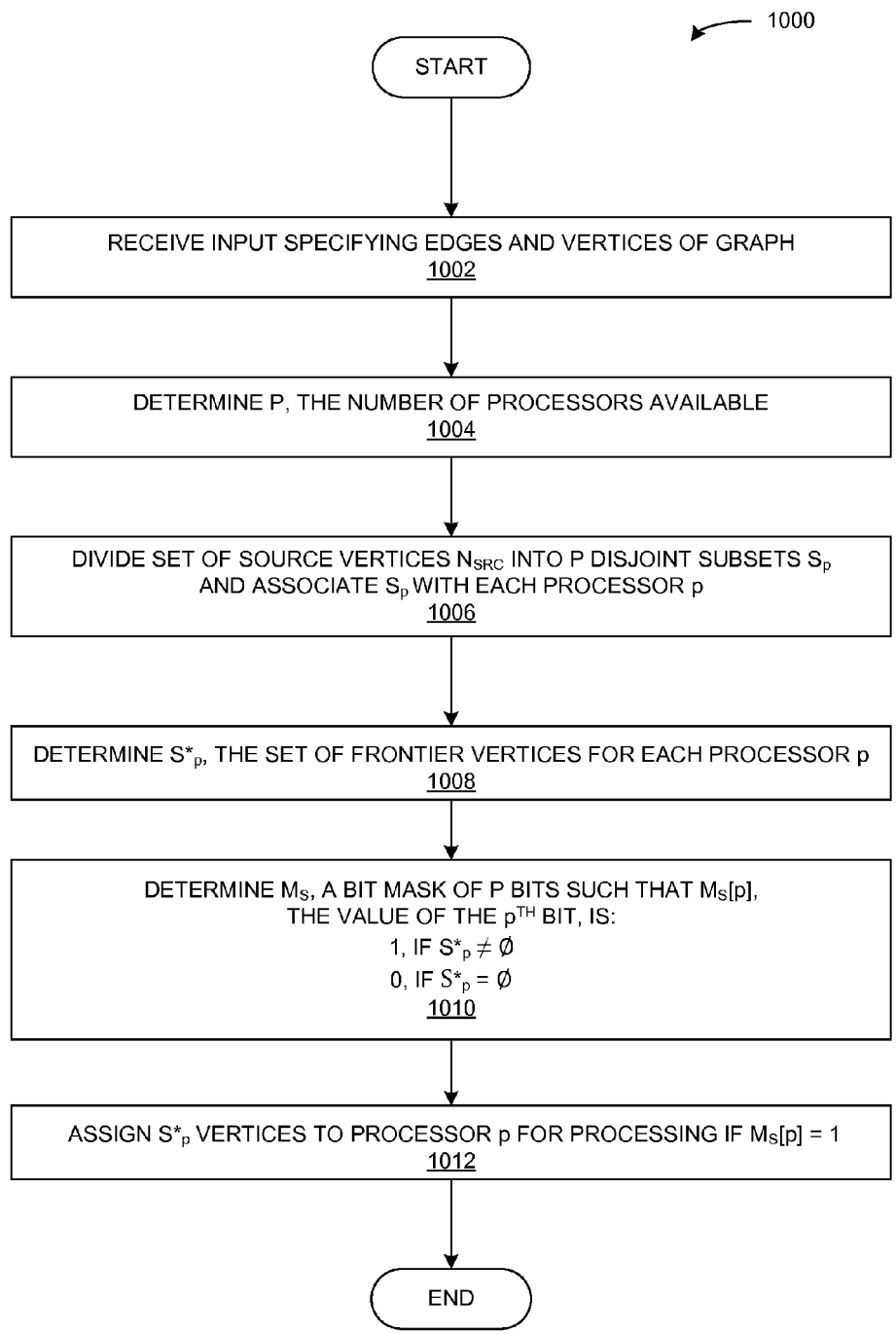
FIG. 10 presents a flowchart illustrating an exemplary process for dynamically assigning vertices to processors for traversal from source vertices to destination vertices in general graphs, according to an embodiment.

FIG. 10 presents a flowchart illustrating an exemplary process for dynamically assigning vertices to processors for traversal from source vertices to destination vertices in general graphs, according to an embodiment. During operation, system 100 receives input specifying edges and vertices of the graph (operation 1002). System 100 may obtain the graph data through user input or as previously stored graph data or through any other method. Next, system 100 determines the number of processors (operation 1004). For example, system 100 may determine that P=50 for 50 processors. Note that system 100 need not perform steps 1002 and 1004 each time system 100 assigns vertices to processors. In some implementations, system 100 may perform steps 1002 and step 1004 once for each graph, and subsequently receive data regarding graph changes.

When system 100 executes traversal step from a source vertex to a destination vertex, system 100 dynamically determines the vertices in the set of source vertices $N_{src}$ to assign to each processor. Initially, system 100 divides the set of source vertices $N_{src}$ into P disjoint subsets $S_p$, each subset $S_p$ associated with each processor p (operation 1006). Next, system 100 determines $S^*_p$, the set of frontier vertices for processor p (operation 1008). System 100 then determines $M_S$, which is a bit mask of p bits such that $M_S[p]$, the value of the $p^{th}$ bit, is 1 if $S^*_p \neq \emptyset$, and such that the value of the $p^{th}$ bit is 0 if $S*_p = \emptyset$ (operation 1010). System 100 then assigns the $S*_p$ frontier vertices to processor p for processing if $M_S[p]=1$ (operation 1012). Note that if $M_S[p]=0$, this means that there are no frontier vertices for the processor p to work on, and, in some embodiments, system 100 may take some work from other processors to assign to processor p.

Figure 11:
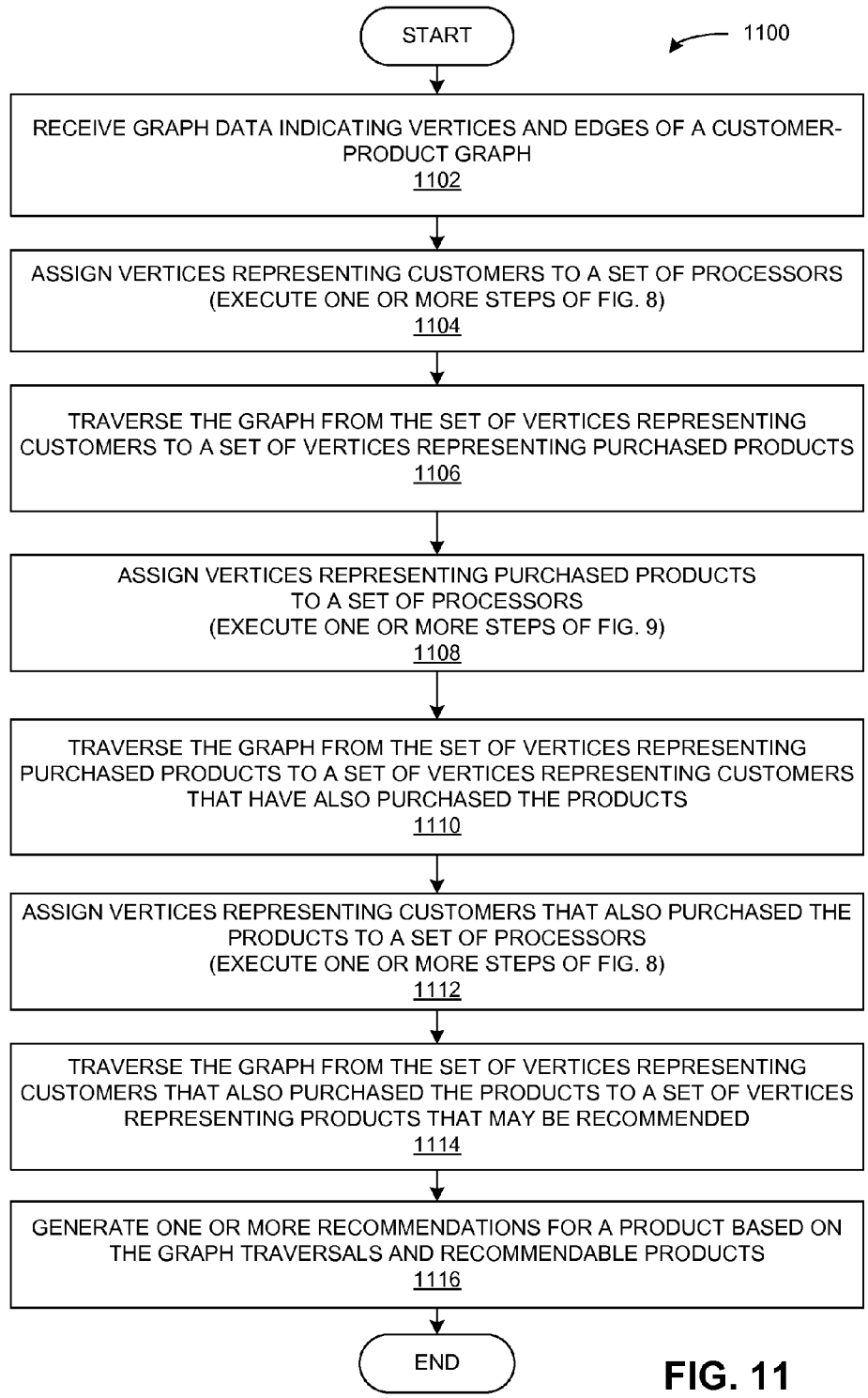
FIG. 11 presents a flowchart illustrating an exemplary process for generating a recommendation for a product utilizing the disclosed processor utilization technique for graph traversals, according to an embodiment.

FIG. 11 presents a flowchart illustrating an exemplary process for generating a recommendation for a product utilizing the disclosed processor utilization technique for graph traversals, according to an embodiment. With this process, system 100 can efficiently utilize processor resources to recommend, to a user that has purchased a product, other products purchased by other people that have also purchased the same product.

During operation, system 100 initially receives graph data indicating vertices and edges of a customer-product graph (operation 1102). The vertices represent customers and products and the edges represent purchases. Such a graph may be a bipartite graph with customers represented as one set of vertices and products represented as another set of vertices. Next, system 100 may assign vertices representing customers to a set of processors (operation 1104). System 100 may perform some steps of the method described in FIG. 8 to dynamically assign customer vertices to processors (e.g., operations 804 to 812). System 100 traverses the graph from the set of vertices representing customers to a set of vertices representing purchased products (operation 1106). System 100 then assigns vertices representing purchased products to a set of processors (operation 1108). System 100 may perform some steps of the method described in FIG. 9 to dynamically assign product vertices to processors (e.g., operations 904 to 912).

In one embodiment, system 100 dynamically assigns vertices to all available processors, and therefore one set of processors may process vertices representing customers at one time and also process vertices representing products at another time. The same set of processors may process both customer vertices and product vertices. Note that, generally, in a dynamic mapping situation, the graph being traversed should be the same, regardless of the traversal direction. The problem of testing whether two graphs are equal is discussed in U.S. patent application Ser. No. 14/039,941, entitled "System and Method for a High-Performance Graph Analytics Engine," by inventors Rong Zhou and Daniel Davies, filed on Sep. 27, 2013, the disclosure of which is incorporated by reference in their entirety herein.

Next, system 100 traverses the graph from the set of vertices representing purchased products to a set of vertices representing customers that have also purchased the products (operation 1110). System 100 then assigns vertices representing customers that also purchased the products to a set of processors (operation 1112). System 100 may perform some steps of the method described in FIG. 8 to dynamically assign customer vertices to processors (e.g., operations 804 to 812). Note that the assignment of customer vertices to processors in this step may be different from the previous assignment of customer vertices to processors in operation 1104. System 100 traverses the graph from the set of vertices representing customers that also purchased the products to a set of vertices representing products that may be recommended (operation 1114). System 100 then generates a recommendation for a product based on the graph traversals and recommendable products (operation 1116). System 100 may use a standard method to choose a selection of the recommendable products for recommendation, such as selecting one or more recommendable products that exceed a predetermined threshold rating or the one that has the highest rating.

Dynamic Mapping on Semi-Bipartite Graphs:

One can illustrate the generality of the disclosed techniques for non-bipartite graphs using the semi-bipartite graph depicted in FIG. 3. Assuming the vertex IDs are numbered from top to bottom on the left and then top to bottom on the right in both FIG. 1A & FIG. 3, i.e., the top (bottom) vertex on the left has an ID of 0 (4), and the top (bottom) vertex on the right an ID of 5 (8), the following are the minimum and maximum source vertex ID statistics:

Traversal from left to right (along the arrow direction)
$n_{min\text{-}src}=0$ and $n_{max\text{-}src}=4$ (FIG. 1A)
$n_{min\text{-}src}=0$ and $n_{max\text{-}src}=4$ (FIG. 3)

Traversal from right to left (against the arrow direction)
$n_{min\text{-}src}=5$ and $n_{max\text{-}src}=8$ (FIG. 1A)
$n_{min\text{-}src}=4$ and $n_{max\text{-}src}=8$ (FIG. 3)

These two graphs share similar structure and thus similar statistics, even though FIG. 1A is bipartite and FIG. 3 is only semi-bipartite. Using the techniques disclosed herein, the parallel search efficiency on these two graphs should be comparable, since they only differ in the $n_{min\text{-}src}$ statistic by 1 (5 vs. 4) for the right-to-left traversal (e.g., V→U in FIG. 1A). For the left-to-right traversal, the two graphs have exactly the same statistics and thus the same vertex-to-processor mapping, which should make their difference in parallel efficiency even smaller, if any. Because the disclosed techniques do not require a strictly bipartite graph, there is no need to check for the bipartiteness of a graph, which can be computationally expensive.

Note that there are also cases where the dynamic mapping technique, by itself, may not result in significant speed increases on general graphs. For example, if there is an edge from vertex 0 (the top left) to vertex 1 (the second top left) in FIG. 3, then the $n_{min\text{-}src}$ statistics would become 1 for the right-to-left traversal, which would reduce the parallel efficiency. If one can rearrange the vertex IDs such that edges violating graph bipartiteness do not have a significant impact on the $n_{min\text{-}src}$ and $n_{max\text{-}src}$ statistics, then the efficiency of dynamic mapping on general graphs can be improved. As always, the parallel efficiency of dynamic mapping is guaranteed on bipartite graphs, no matter how the vertices are numbered. Since the overhead of dynamic mapping is negligible, there is usually no harm of doing it even when it is less effective on certain general graphs.

Integrating Dynamic Mapping into a General-Purpose Graph Analytics Engine

So far this disclosure has described a dynamic vertex-to-processor mapping strategy, which one can implement in a system for efficient graph traversal. However, there can still be challenges when the dynamic mapping strategy is integrated with a general-purpose graph analytics engine. Below is a description of the basic steps to facilitate a seamless integration.

System 100 annotates graphs with their $n_{min\text{-}src}$ and $n_{max\text{-}src}$ statistics in each traversal direction. System 100 achieves this with a graph reading function that keeps track of the minimum and maximum IDs for non-isolated vertices when the graph is first loaded. If system 100 can dynamically modify a graph, then system 100 needs to update such statistics accordingly when the graph changes. This should add little overhead to the engine, since these statistics are simple to track.

The vertex-to-processor mapping function divides up the range [$n_{min\text{-}src}$, $n_{max\text{-}src}$] instead of the full range of vertex IDs (e.g., $[0, n_{max}]$ or $[n_{min}, n_{max}]$) and subsequently assigns vertices within the subranges to the processors or threads for parallel search.

To efficiently find those frontier vertices (e.g., without enumerating all the vertices explicitly), the graph analytics engine can use a bitmask (e.g., similar to $M_S$) that keeps a flag for each subrange. System 100 sets the flag of a subrange to indicate that the subrange contains one or more frontier vertices for the next (i.e., the closest future) traversal step (unlike $M_S$, which is defined for the current traversal step). Although system 100 updates these subrange-has-frontier-vertex flags in the current traversal step, they are intended to save computation for the next traversal step, which can use them to safely skip those subranges whose flags are not set.

Traversal-based computation may need to co-exist with other non-traversal-based computation in a general-purpose graph analytics engine. Thus, one should make sure the engine uses various bitmasks (e.g., $M_S$) and flags (e.g., subrange-has-frontier-vertex flags) (e.g., initialized, accessed, and destroyed) properly, especially if such data structure is shared between traversal-based and non-traversal-based computation. For example, if two traversal steps are separated by a non-traversal step that can potentially invalidate the subrange-has-frontier-vertex flags, then the engine should err on the safe side and ignore such flags for the interest of computation correctness.

Experimental Results

Dynamic mapping can achieve close to 100% parallel efficiency on bipartite graphs and certain semi-bipartite graphs, in contrast to static mapping which suffers from low efficiency. Depending on the traversal direction and the ratio between the two partition sizes, static mapping can be arbitrarily worse than dynamic mapping for parallel search on bipartite graphs. To evaluate the practical benefits of the disclosed techniques, the inventors conducted the following experiments using a real-world dataset from the retail business.

The experiment utilized a graph based on customer purchase data of the following form: <customer_id><product_id>, where a customer with <customer_id> purchases a product with <product_id>. As mentioned earlier, the customer-bought-product graph is a bipartite graph where an edge can only exist between a customer vertex and a product vertex. The benchmark query is the same collaborative filter described earlier (repeated below for convenience):

1. Starting from a customer vertex, find the set of products purchased by the customer
2. Find other customers who have purchased at least one of these products
3. Find the most popular product purchased by these customers The inventors chose the collaborative filter query above to benchmark the parallel efficiency of the disclosed techniques for the following reasons. First, it requires both U→V traversal (customer→products in Step 1) and V→U traversal (products→customers in Step 2). Second, the query contains some non-graph based computation, such as initializing the counters responsible for keeping track of the number of times various products were purchased.

Furthermore, since the implementation allows multiple filter criteria besides a common product purchase (e.g., a common product browsed), it uses additional data structures such as bitmaps to refine the set of customers who are related in some way to the "seed" customer in Step 1. Computations such as these exercise the non-graph aspects of the engine, which increases the application realism of the experiments, as many real-world analytics problems require both graph and non-graph based computation. To avoid non-graph computations from dominating the graph-based ones in wall-clock seconds, the experiment did not require system 100 to output the results and write them to a file stored on disk, although the inventors verified that results written to the file would have been exactly the same for both static and dynamic mapping.

The experiments used a customer-bought-product graph with about 24.4 million edges in one traversal direction. Thus, the total number of edges stored is about 24.4×2=48.8 million edges for traversals in other directions. There are about 3 million unique customers and over 400K unique products at the stock keeping unit (SKU) level. Thus, the ratio between |U| and |V| is around 7 or 8. System 100 randomly chose a set of 100 customers as different "seeds" of the query used in Step 1, and the average wall-clock seconds were recorded and compared between different vertex-to-processor mapping approaches. As the baseline, the experiment included a static mapping implementation that statically divides up the set of vertices into disjoint subranges and then assigns different subranges to different processors for parallel search. All threads in the baseline implementation collectively process the full range of vertices, whereas the new dynamic mapping approach does so only for the source vertices. The experiment utilized a test machine with an Intel Xeon E3-1225 3.1 GHz processor equipped with 4 cores and 8 GB of RAM. The experiment used the best configuration available for the baseline and the new parallel technique enabled by this disclosure.

The average wall-clock time for processing 100 random seed customers is 36 milliseconds for static mapping, and 14 milliseconds for dynamic mapping, which is about 2.6× faster than the baseline. As mentioned earlier, a number of computation steps, including memory initialization and customer filtering, in the benchmark are common to both the baseline and the new techniques. Thus, the relative speed advantage of dynamic mapping in terms of pure graph traversal can be significantly greater than what is reported here. Furthermore, the test machine only has 4 cores, so the maximum parallel speed-up is limited to 4×. However, with more cores, it is likely that the dynamic mapping strategy can achieve even greater speed increases.

Exemplary Apparatus

Figure 12:
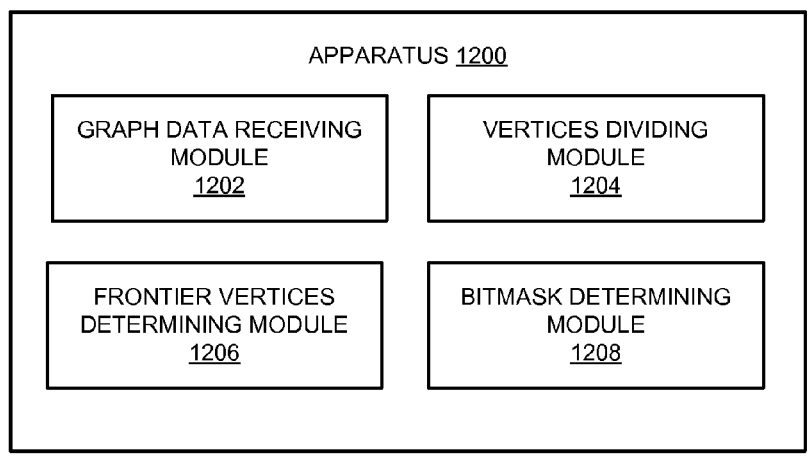
FIG. 12 illustrates an exemplary apparatus that facilitates dynamically assigning frontier vertices to processors for traversal, in accordance with an embodiment.

FIG. 12 illustrates an exemplary apparatus 1200 that facilitates dynamically assigning frontier vertices to processors for traversal, in accordance with an embodiment. Apparatus 1200 can comprise a plurality of modules which may communicate with one another via a wired or wireless communication channel. Apparatus 1200 may be realized using one or more integrated circuits, and may include fewer or more modules than those shown in FIG. 12. Further, apparatus 1200 may be integrated in a computer system, or realized as a separate device which is capable of communicating with other computer systems and/or devices. Specifically, apparatus 1200 can comprise a graph data receiving module 1202, a vertices divided module 1204, a frontier vertices determining module 1206, and a bitmask determining module 1208.

In some embodiments, graph data receiving module 1202 can receive the data describing vertices and edges of a graph. Vertices dividing module 1204 can divide the vertices among the processors using the techniques described herein. Frontier vertices determining module 1206 determines the vertices that are part of the search frontier. Bitmask determining module 1208 determines the bitmasks. Note that graph management module 102 illustrated in FIG. 1 may provide any and all functions of the various modules depicted in FIG. 12.

Exemplary System

Figure 13:
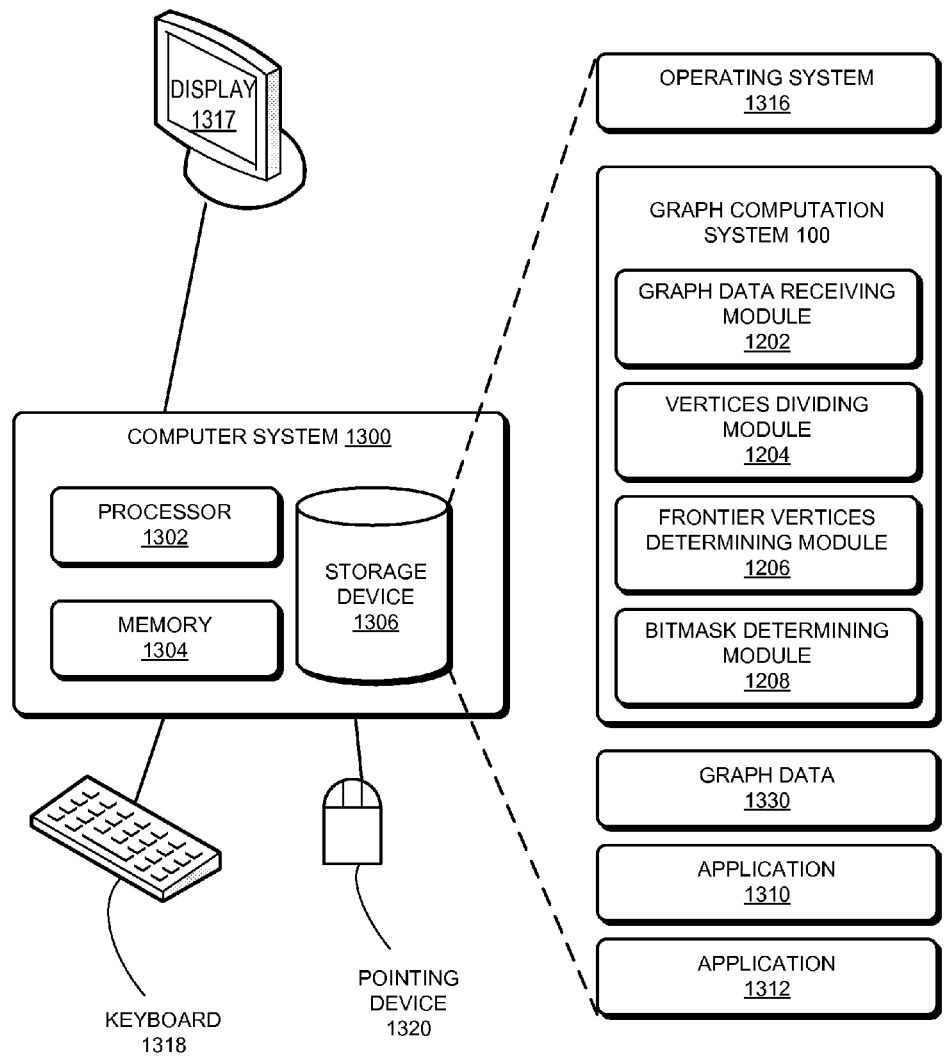
FIG. 13 illustrates an exemplary computer system that facilitates dynamically assigning vertices to processors for traversal, in accordance with an embodiment.

FIG. 13 illustrates an exemplary computer system 1300 that facilitates dynamically assigning vertices to processors for traversal, in accordance with an embodiment. In one embodiment, computer system 1300 includes a processor 1302, a memory 1304, and a storage device 1306. Storage device 1306 stores a number of applications, such as applications 1310 and 1312 and operating system 1316. Storage device 1306 also stores graph computation system 100, which may include a graph data receiving module 1202, vertices dividing module 1204, frontier vertices determining module 1206, and bitmask determining module 1208. Storage device 1306 may also store graph data 1330. During operation, one or more applications, such as graph computation system 100, are loaded from storage device 1306 into memory 1304 and then executed by processor 1302. While executing the program, processor 1302 performs the aforementioned functions. Computer and communication system 1300 may be coupled to an optional display 1317, keyboard 1318, and pointing device 1320.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for optimizing a recommendation computation, comprising:
   obtaining, from a storage device, a bipartite graph comprising a disjoint first set of vertices and second set of vertices;
   performing, by a set of processors, a first graph traversal from the first set of vertices to the second set of vertices, which involves:
   allocating only the first set of vertices among the set of processors, which further comprises assigning a first disjoint subset of the first set of vertices exclusively to a respective processor, wherein assigning the first disjoint subset further comprises:
   estimating a maximum number of vertices assigned to each processor according to a total number of vertices in the first set divided by a total number of processors; and
   assigning the first set of vertices among the set of processors based on the estimated maximum number; and
   traversing, by the respective processor, the graph from the first disjoint subset of vertices assigned to the respective processor to a first destination subset of the second set of vertices;
   performing, by the set of processors, a second graph traversal from the second set of vertices to the first set of vertices, which involves:
   allocating only the second set of vertices among the set of processors, which involves assigning a second disjoint subset of the second set of vertices exclusively to the same respective processor in the set of processors:
   wherein the second disjoint subset of vertices does not have vertices in common with the first disjoint subset ; and
   wherein assigning the second disjoint subset of vertices is based on a total number of vertices in the second disjoint subset of vertices divided by the total number of processors;
   selecting, from the second disjoint subset of vertices assigned to the respective processor, a frontier subset of vertices; and
   traversing, by the respective processor, the graph from the frontier subset of vertices selected for the respective processor to a second destination subset of the first set of vertices associated with any of the frontier subset of vertices by one or more edges of the bipartite graph;
   performing, by the set of processors, a third graph traversal from the first set of vertices to the second set of vertices, which involves:
   allocating only the first set of vertices among the set of processors, which further comprises assigning a third disjoint subset of the first set of vertices exclusively to the same respective processor:
   wherein the third disjoint subset of vertices does not have vertices in common with the second disjoint subset; and
   wherein assigning the third disjoint subset of vertices is based on a total number of vertices in the third disjoint subset of vertices divided by the total number of processors; and
   traversing, by the respective processor, the graph from the third disjoint subset of vertices assigned to the respective processor to a third destination subset of the second set of vertices; and
   generating a recommendation based at least on a count of the third destination subset of the second set of vertices.

2. The method of claim 1, wherein traversing the graph from the frontier subset of vertices selected for the respective processor involves:
   generating a bitmask $M_U$ such that $M_U[p]$, the value of the $p^{th}$ bit, is:
   1, if the frontier subset of vertices selected for processor p is not null; and 0, if the frontier subset of vertices selected for processor p is null; and instructing processor p to execute the graph-traversal analysis if $M_U[p]$ is 1.

3. The method of claim 1, wherein assigning a disjoint subset of a respective set of vertices to the respective processor further comprises:

estimating a maximum number of vertices assigned to each processor according to a formula $\lfloor(u_{max}-u_{min}+1)/P\rfloor$, wherein P is the number of processors, $u_{max}$ is a maximum integer identifier for vertices $\epsilon U$, and $u_{min}$ is a minimum integer identifier for vertices $\epsilon U$, where U represents the first set of vertices; and dividing the respective set of vertices uniformly among the set of processors based on the estimated maximum number of vertices assigned to each processor.

4. The method of claim 1, wherein assigning a disjoint subset of a respective set of vertices to a respective processor further comprises:

dividing the respective set of vertices non-uniformly among the set of processors.

5. The method of claim 1, wherein the first set of vertices represents customers, the second set of vertices represents products, and the generated recommendation is a product recommendation for a customer.

6. The method of claim 1, further comprising:

annotating the graph with $n_{min-src}$ and $n_{max-src}$ statistics for a subsequent traversal, wherein $n_{min-src}$ specifies a minimum vertex ID among a set of vertices acting as sources in the subsequent traversal and $n_{max-src}$ specifies a maximum vertex ID among the set of vertices acting as sources in the subsequent traversal; and updating a bitmask to indicate whether the vertices assigned to a respective processor will contain frontier vertices during the subsequent graph traversal.

7. The method of claim 1, further comprising at least one additional graph traversal, wherein the at least one additional graph traversal comprises:

allocating a set of vertices among the set of processors that are to execute the at least one additional graph traversal, which further comprises assigning a disjoint subset of the set of vertices exclusively to the respective processor; and traversing, by a respective processor, the graph from the disjoint subset of the set of vertices assigned exclusively to the respective processor to an additional destination subset of the set of vertices.

8. A computer-readable storage medium storing instructions that when executed by a computer cause the computer to perform a method for optimizing a recommendation computation, the method comprising:

performing, in a bipartite graph comprising a disjoint first set of vertices and second set of vertices, by a set of processors, a first graph traversal from the first set of vertices to the second set of vertices, which involves:

allocating only the first set of vertices among the set of processors, which further comprises assigning a first disjoint subset of the first set of vertices exclusively to a respective processor, wherein assigning the first disjoint subset further comprises:

estimating a maximum number of vertices assigned to each processor according to a total number of vertices in the first set divided by a total number of processors; and assigning the first set of vertices among the set of processors based on the estimated maximum number; and traversing, by the respective processor, the graph from the first disjoint subset of vertices assigned to the respective processor to a first destination subset of the second set of vertices;

performing, by the set of processors, a second graph traversal from the second set of vertices to the first set of vertices, which involves:

allocating only the second set of vertices among the set of processors, which involves assigning a second disjoint subset of the second set of vertices exclusively to the same respective processor in the set of processors:

wherein the second disjoint subset of vertices does not have vertices in common with the first disjoint subset; and wherein assigning the second disjoint subset of vertices is based on a total number of vertices in the second disjoint subset of vertices divided by the total number of processors;

selecting, from the second disjoint subset of vertices assigned to the respective processor, a frontier subset of vertices; and traversing, by the respective processor, the graph from the frontier subset of vertices selected for the respective processor to a second destination subset of the first set of vertices associated with any of the frontier subset of vertices by one or more edges of the bipartite graph;

performing, by the set of processors, a third graph traversal from the first set of vertices to the second set of vertices, which involves:

allocating only the first set of vertices among the set of processors, which further comprises assigning a third disjoint subset of the first set of vertices exclusively to the same respective processor:

wherein the third disjoint subset of vertices does not have vertices in common with the second disjoint subset; and wherein assigning the third disjoint subset of vertices is based on a total number of vertices in the third disjoint subset of vertices divided by the total number of processors; and traversing, by the respective processor, the graph from the third disjoint subset of vertices assigned to the respective processor to a third destination subset of the second set of vertices; and generating a recommendation based at least on a count of the third destination subset of the second set of vertices.

9. The computer-readable storage medium of claim 8, wherein traversing the graph from the frontier subset of vertices selected for the respective processor involves:

generating a bitmask $M_U$ such that $M_U[p]$, the value of the $p^{th}$ bit, is:

1, if the frontier subset of vertices selected for processor p is not null; and 0, if the frontier subset of vertices selected for processor p is null; and instructing processor p to execute the graph-traversal analysis if $M_U[p]$ is 1.

10. The computer-readable storage medium of claim 8, wherein assigning a disjoint subset of a respective set of vertices to the respective processor further comprises:

estimating a maximum number of vertices assigned to each processor according to a formula $\lfloor(u_{max}-u_{min}+1)/$ P⌋, wherein P is the number of processors, $u_{max}$ is a maximum integer identifier for vertices ∈U, and $u_{min}$ is a minimum integer identifier for vertices ∈U, where U represents the first set of vertices; and dividing the respective set of vertices uniformly among the set of processors based on the estimated maximum number of vertices assigned to each processor.

11. The computer-readable storage medium of claim 8, wherein assigning a disjoint subset of a respective set of vertices to a respective processor further comprises:

dividing the respective set of vertices non-uniformly among the set of processors.

12. The computer-readable storage medium of claim 8, wherein the first set of vertices represents customers, the second set of vertices represents products, and the generated recommendation is a product recommendation for a customer.

13. The computer-readable storage medium of claim 8, wherein the method comprises at least one additional graph traversal, further comprising:

allocating a set of vertices among the set of processors that are to execute the at least one additional graph traversal, which further comprises assigning a disjoint subset of the set of vertices exclusively to the respective processor; and traversing, by a respective processor, the graph from the disjoint subset of the set of vertices assigned exclusively to the respective processor to an additional destination subset of the set of vertices.

14. A computing system for optimizing a recommendation computation, the system comprising:

a set of processors, a computer-readable medium coupled to the set of processors having instructions stored thereon that, when executed by the set of processors, cause the set of processors to perform operations comprising:

performing, in a bipartite graph comprising a disjoint first set of vertices and second set of vertices, a first graph traversal from the first set of vertices to the second set of vertices, which involves:

allocating only the first set of vertices among the set of processors, which further comprises assigning a first disjoint subset of the first set of vertices exclusively to a respective processor, wherein assigning the first disjoint subset further comprises:

estimating a maximum number of vertices assigned to each processor according to a total number of vertices in the first set divided by a total number of processors; and assigning the first set of vertices among the set of processors based on the estimated maximum number; and traversing, by the respective processor, the graph from the first disjoint subset of vertices assigned to the respective processor to a first destination subset of the second set of vertices;

performing a second graph traversal from the second set of vertices to the first set of vertices, which involves:

allocating only the second set of vertices among the set of processors, which involves assigning a second disjoint subset of the second set of vertices exclusively to the same respective processor in the set of processors:

wherein the second disjoint subset of vertices does not have vertices in common with the first disjoint subset; and wherein assigning the second disjoint subset of vertices is based on a total number of vertices in the second disjoint subset of vertices divided by the total number of processors;

selecting, from the second disjoint subset of vertices assigned to the respective processor, a frontier subset of vertices; and traversing, by the respective processor, the graph from the frontier subset of vertices selected for the respective processor to a second destination subset of the first set of vertices associated with any of the frontier subset of vertices by one or more edges of the bipartite graph;

performing a third graph traversal from the first set of vertices to the second set of vertices, which involves:

allocating only the first set of vertices among the set of processors, which further comprises assigning a third disjoint subset of the first set of vertices exclusively to the same respective processor:

wherein the third disjoint subset of vertices does not have vertices in common with the second disjoint subset; and wherein assigning the third disjoint subset of vertices is based on a total number of vertices in the third disjoint subset of vertices divided by the total number of processors; and traversing, by the respective processor, the graph from the third disjoint subset of vertices assigned to the respective processor to a third destination subset of the second set of vertices; and generating a recommendation based at least on a count of the third destination subset of the second set of vertices.

15. The computing system of claim 14, wherein traversing the graph from the frontier subset of vertices selected for the respective processor involves:

generating a bitmask $M_U$ such that $M_U[p]$, the value of the $p^{th}$ bit, is:

1, if the frontier subset of vertices selected for processor p is not null; and 0, if the frontier subset of vertices selected for processor p is null; and instructing processor p to execute the graph-traversal analysis if $M_U[p]$ is 1.

16. The computing system of claim 14, wherein assigning a disjoint subset of a respective set of vertices to the respective processor further comprises:

estimating a maximum number of vertices assigned to each processor according to a formula ⌊$(u_{max}-u_{min}+1)$/P⌋, wherein P is the number of processors, $u_{max}$ is a maximum integer identifier for vertices ∈U, and $U_{min}$ is a minimum integer identifier for vertices ∈U, where U represents the first set of vertices; and dividing the respective set of vertices uniformly among the set of processors based on the estimated maximum number of vertices assigned to each processor.

17. The computing system of claim 14, wherein assigning a disjoint subset of a respective set of vertices to a respective processor further comprises:

dividing the respective set of vertices non-uniformly among the set of processors.

18. The computing system of claim 14, wherein the first set of vertices represents customers, the second set of vertices represents products, and the generated recommendation is a product recommendation for a customer.

19. The computing system of claim 14, wherein the operations comprise at least one additional graph traversal, further comprising:

allocating a set of vertices among the set of processors that are to execute the at least one additional graph traversal, which further comprises assigning a disjoint subset of the set of vertices exclusively to the respective processor; and traversing, by a respective processor, the graph from the disjoint subset of the set of vertices assigned exclusively to the respective processor to an additional destination subset of the set of vertices.

* * * * *